United States Patent [19]
DeVincentis

[11] Patent Number: 5,896,787
[45] Date of Patent: Apr. 27, 1999

[54] OPTICAL FIBER STRIPPER

[75] Inventor: David S. DeVincentis, Morris County, N.J.

[73] Assignee: Lucent Technologies, Inc., Murry Hill, N.J.

[21] Appl. No.: 08/691,736

[22] Filed: Aug. 2, 1996

Related U.S. Application Data

[63] Continuation-in-part of application No. 08/596,802, Feb. 5, 1996, Pat. No. 5,819,602.

[51] Int. Cl.$^6$ ....................................................... H02G 1/12
[52] U.S. Cl. .............................................. 81/9.51; 81/9.41
[58] Field of Search ........................ 81/9.4, 9.51; 29/825; 156/584, 344; 385/134, 147

[56] References Cited

U.S. PATENT DOCUMENTS

| | | | |
|---|---|---|---|
| 3,330,036 | 7/1967 | Mahoney | 81/9.4 |
| 4,067,105 | 1/1978 | Zahn et al. | 29/747 X |
| 4,715,251 | 12/1987 | Margolin et al. | 81/9.4 |
| 5,298,105 | 3/1994 | Dorsey | 81/9.4 X |
| 5,481,638 | 1/1996 | Roll et al. | 81/9.4 |

*Primary Examiner*—D. S. Meislin

[57] ABSTRACT

An assembly includes a collet including radially convergible jaws for receipt of an optical fiber threaded through the collet and outwardly from the rear opening of a housing containing the collet. The assembly comprises a container for a fluid for softening the plastic coating of a fiber extending through the assembly. When the plastic coating has softened, a barrel is screwed inwardly of the housing and against a surface of the collet for causing convergence of, and grasping of the plastic coating by, the collet jaws. The assembly is then moved axially of the fiber for stripping the softened plastic coating from a front end of the fiber.

22 Claims, 3 Drawing Sheets

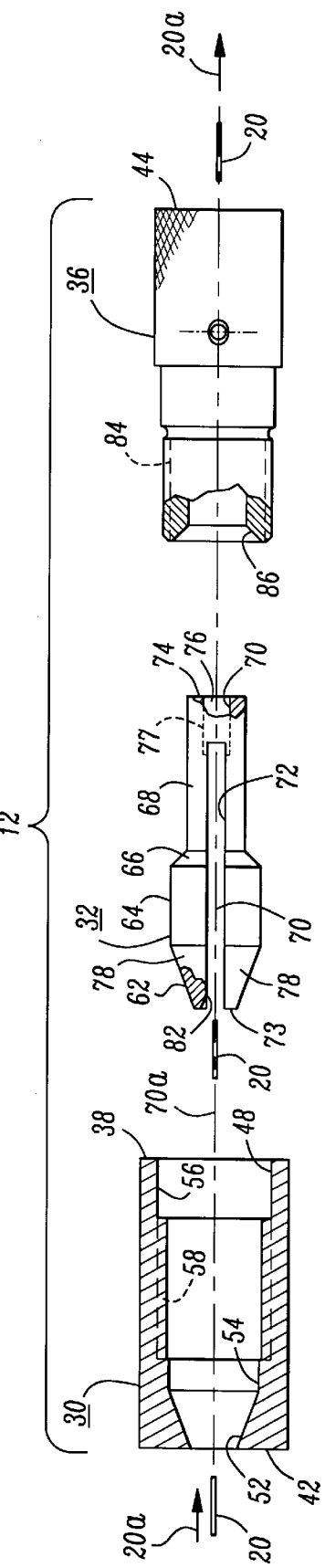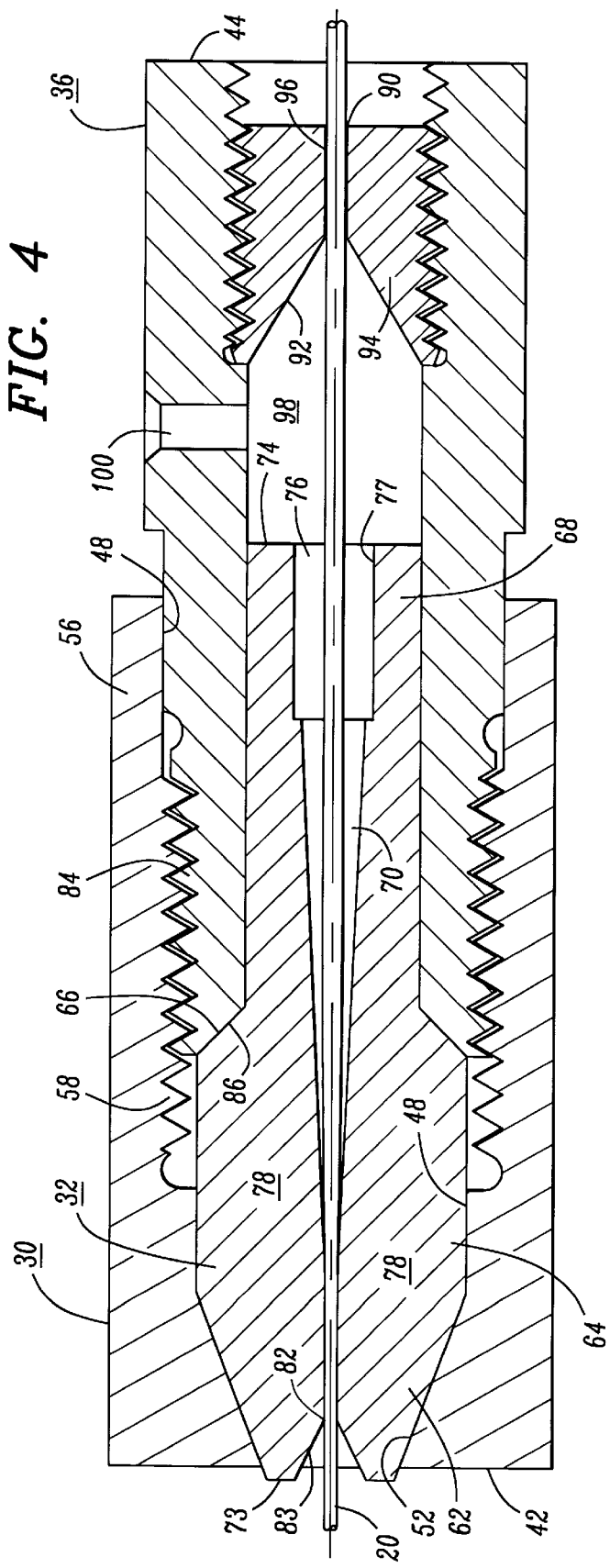

OPTICAL FIBER STRIPPER

This application is a continuation-in-part of Ser. No. 08/596,802, filed Feb. 5, 1996, by myself and others and entitled "Optical Fiber Coating Stripping," now U.S. Pat No. 5,819,602, issued Oct. 13, 1998.

This invention was made with Government support. The Government has certain rights in this invention.

BACKGROUND OF THE INVENTION

This invention relates to plastic coated optical fibers, and particularly to a method and apparatus for first softening and then stripping a preselected length of a plastic coating from the end of a fiber without damage of interior glass portions of the fiber.

Optical fibers are now extensively used in various telecommunication systems and many techniques have been developed for fiber splicing. In one technique, for example, the plastic coating of a fiber is first soaked in a chemical bath for softening the plastic coating for causing it to expand into tight fit within a surrounding tube which is then pulled, along with the plastic coating, off an end of the fiber. Problems exist, however, in obtaining a sharp break in the plastic coating and preventing damage of the underlying glass portions. These problems show up as poor quality fiber to fiber splices.

In my above-identified co-pending parent application, there is disclosed a fiber stripping apparatus for cracking and stripping an extremely thin, outer, color coding layer from a fiber. The apparatus uses a chuck assembly including convergible jaws for symmetrically grasping and slightly compressing the fiber outer layer. The present invention makes use of a convergible jaw mechanism somewhat similar to the jaw mechanism disclosed in my parent application, and the subject matter thereof is incorporated herein by reference.

SUMMARY OF THE INVENTION

A convergible jaw mechanism, referred to hereinafter as a "collet", is disposed within an outer housing having opposite front and rear open ends. The front end of the collet is exposed through the front end of the housing for receipt of the front end of an optical fiber threaded axially through the collet. The rear end of the housing receives a hollow barrel axially movable against a conic surface of the collet for causing symmetrical convergence of the collet jaws against the fiber. An internal portion of the barrel serves as a guide for the receipt and rearward guidance of a fiber threaded through the collet and outwardly through a rear opening of the barrel. With a fiber threaded through the assembly, the front and rear openings of the assembly are effectively sealed for establishing an interior space surrounding the fiber for receipt and retention of a plastic softening fluid.

In use of the assembly, an end of an optical fiber is threaded axially through the assembly while the collet jaws are open. A plastic softening fluid is then introduced into the assembly through a side opening through the barrel and into contact with the fiber within the collet. After the fiber outer plastic has been softened, the collet jaws are converged onto the fiber along a short length thereof adjacent to the front end of the collet and, with the softened plastic coating firmly grasped by the collet jaws, the entire assembly is pulled off the fiber end for stripping the fiber plastic coating from the fiber.

DESCRIPTION OF THE DRAWING

The drawings are not necessarily to scale.

FIG. 3 is an exploded side view of the assembly shown in FIG. 1, the left-hand most component of the assembly being shown in section, the other two assembly components being partially broken away, and the middle (collet) component being shown in its "open" condition;

FIG. 4 is a side elevation of the assembly shown in FIG. 1 with the collet component being in its "closed" condition clamped about a fiber;

DESCRIPTION OF PREFERRED EMBODIMENTS OF THE INVENTION

Figure 1:
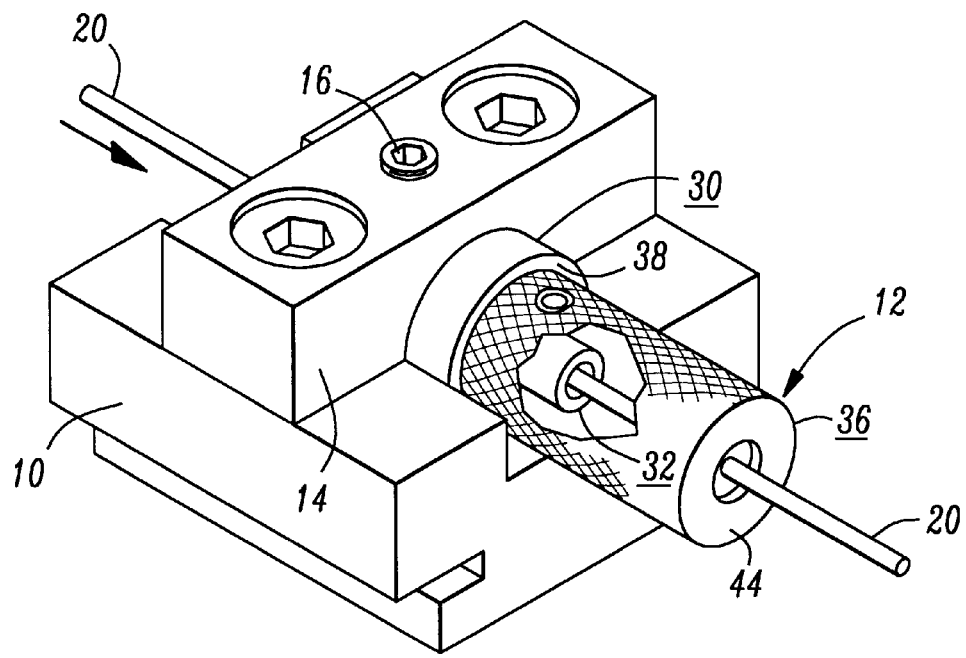
FIG. 1 is a perspective view, partially broken away, of a stripping assembly in accordance with this invention, the assembly being shown mounted and clamped in place on an optional slide block, and also showing an optical fiber, partially broken away, threaded through the assembly.

With reference to FIG. 1, there is shown a slide block 10 on which the stripping assembly 12 to be described is mounted. The clamping assembly 12 is rigidly mounted on the slide block 10 by means of a clamping bar 14 screwed to the block 10. A set screw 16 locks the assembly in place. The use of the slide block 10 is optional but provides a simple means for moving the stripping assembly precisely axially along an optical fiber mounted, by known clamps, parallel to a track on which the slide block 10 is mounted. Thus, in one use of the inventive assembly (described in greater detail hereinafter), the leading end of an optical fiber 20 is threaded through the assembly, a portion of the trailing length of the fiber extending outwardly from the assembly is clamped in axial alignment with the assembly, and, at the conclusion of the process, the assembly is slid axially forwardly of the clamped-in-place fiber for stripping the plastic outer coating or coatings off the leading end of the fiber.

Figure 2:
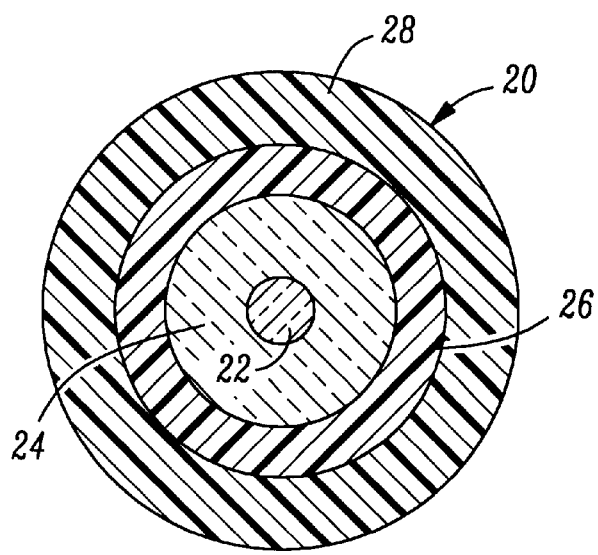
FIG. 2 is a cross-section of an optical fiber comprising a glass core surrounded by two plastic layers to be stripped from the fiber.

The cross-section of a typical two plastic layer coated fiber 20 is shown in FIG. 2. The fiber 20 includes a central glass core 22, a glass cladding layer 24, a relatively soft, primary plastic encapsulating layer 26 and a relatively hard, secondary plastic encapsulating layer 28. A known technique used for removing the two plastic layers 26 and 28 involves soaking a length of the fiber in a bath of methylene chloride for softening the two layers for easier removal. The present invention makes use of such softening process.

The present invention has utility with known plastic coated optical fibers in general. By way of illustration, the present invention is described for use with a two layer fiber 20 having an outside diameter of 250 microns. The outer plastic layer 28 has a thickness of around 25 microns, and the inner plastic layer 26 has a thickness of around 37.5 microns. The layers 26 and 28 are of known ultra violet curable materials and can be softened for easier removal by soaking in a chemical bath. Soaking of the optical fiber 20 in methylene chloride for two minutes, for example, causes both plastic layers to soften and swell, the outer diameter of the fiber 20 expanding to around 300 microns.

Returning to FIG. 1, the stripping assembly 12 comprises an outer, hollow cylindrical housing 30, a collet 32 including (FIGS. 5 and 6) four circumferentially spaced, radially convergible jaws 78, and a hollow, cylindrical barrel 36 mounted on an end 38 of the housing 30 in threaded, telescoping relationship with the housing 30.

The purpose of the assembly 12 is to receive an end of an optical fiber 20 threaded axially through the assembly, provide an enclosed space surrounding the fiber for receipt of a fluid for contacting and softening the plastic layers 26 and 28 of the fiber, and to then grasp a length of the softened layers for stripping the softened layers off the fiber as the assembly is moved axially of the fiber towards and beyond its free end.

Because a fiber is threaded through the assembly from left to right as viewed in FIG. 3, it is convenient to refer to the assembly as having front 42 and rear 44 ends. The fiber 20 is threaded through the front end 42 and exits from the rear end 44 as indicated by the arrows 20a.

The outer housing 30 of the assembly is basically a hollow, circular cylinder having (FIG. 4) an inner surface 48 configured to interact with the collet 32 and barrel 36 portions of the assembly. The housing inner surface 48 is circular in cross-section and defines (FIG. 3) three front-to-rear sections as follows; a conical section 52 of increasing diameter from front to rear; a first circular cylindrical section 54 extending rearwardly from the conical section 52; and a second circular cylindrical section 56 extending the remaining length of the housing 30. A front portion 58 of the second cylindrical section 56 has an internal screw thread. The housing 30 is rigidly clamped (FIG. 1) by the clamping bar 14 to the slide block 10 and has no moving parts.

The collet 32 is a hollow, circular cylindrical member preferably machined from a starting solid cylindrical block of metal. The collet 32 comprises (FIG. 3) four axially extending sections; namely, a front conical section 62 joined to a middle circular cylindrical section 64 joined in turn by a conic surface 66 to an end or shank circular cylindrical section 68.

The collet 32 includes a central passageway 70 extending along the entire length of the collet, and three slots 72 (FIGS. 5 and 6) which extend axially from the front end 73 (FIG. 3) of the collet close to but not all the way to the rear end 74 of the collet. A fourth slot 76 is also provided which extends axially the full length of the collet. All four slots 72 and 76 extend radially entirely through the outer wall of the collet to the central passageway 70 and subdivide the outer wall into four circumferentially extending segments 78 all cantilevered from a rear end portion 74 of the shank 68. When viewed (FIG. 6) from the rear, the shank rear end 74 is of C-shape. Forwardly of the C-shaped shank rear end portion 74, the collet comprises only the four circumferentially spaced apart wall segments 78. The C-shaped rear end portion 74 of the collet, to which all the wall segments 78 are cantileverly joined, is of relatively short axial length, whereby the four wall segments of metal are similar to leaf springs which, while relatively stiff, can still be readily resiliently deflected. The spaced apart cantilevered wall segments 78 comprise the aforementioned jaws for grasping the softened plastic layers of the optical fiber.

Figure 5:
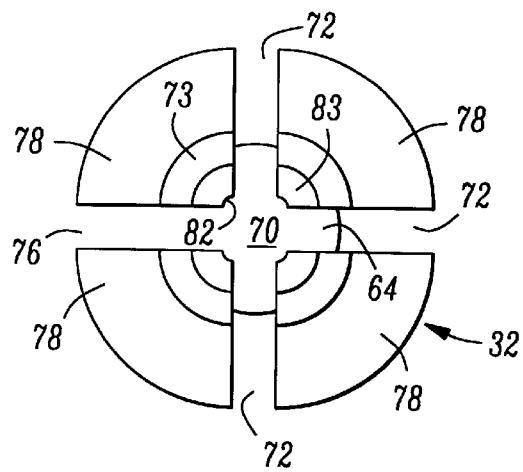
FIG. 5 is a "front" view of the "open" condition collet shown in FIG. 3 and looking from the left.
Figure 6:
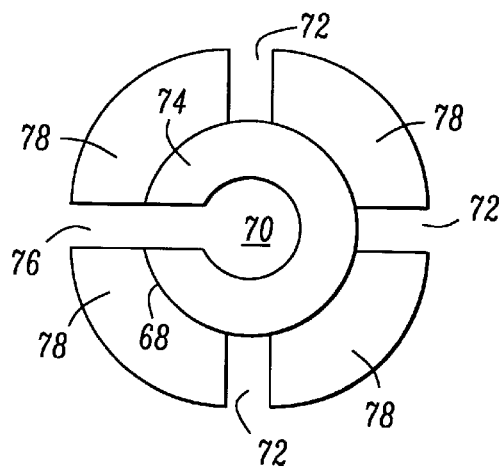
FIG. 6 is a view similar to FIG. 5 but showing the opposite "rear" end of the collet.

The collet central passageway 70 is of circular cross-section having a constant diameter from its rear end 74 to a point 82 (FIG. 4) adjacent to its front end 73 where the passageway tapers outwardly in a conic surface 83 towards the front end. The passageway 70 has two inside diameters; one when (FIGS. 3 and 5) the collet is in its "open" position with the wall segments 78 being circumferentially spaced apart, and the other when (FIGS. 4 and 7) the wall segments 78 have been (as hereinafter described) forced radially inwardly and into mutual side-by-side contact. While the precision of both inside diameters is important, the passageway inside diameter (axially variable, as hereinafter described) when the passageway is in its closed (FIG. 4) state is critical. One technique for obtaining a high degree of precision is to first form the collet 32 substantially as shown in FIGS. 3, 5 and 6 but with a passageway having a quite small inside diameter. Then, with the wall segments pressed together into mutual side-by-side contact, drilling into the passageway from the front end to provide the desired inside (closed) diameter of the passageway. Thereafter, in use of the collet, when the wall segments 78 are firmly squeezed into their closed (FIGS. 4 and 7) mutually contacting relationship, the diameter of the closed condition passageway is precisely re-established.

As shown in FIG. 4, the collet 32 is disposed snugly within the outer housing 30 with the outer surface of the middle cylindrical portion 64 of the collet in mating, surface-to-surface contact with the inside surface 48 of the outer housing. The conical, front end 62 of the collet similarly fits snugly within the inwardly tapered portion 52 of the housing inner surface with a short length of the front conical section 62 of the collet protruding beyond the front end 42 of the housing.

The mating, surface-to-surface contact between outer surface portions of the collet and inner surface portions of the housing provides precise, co-axial positioning of the collet 32 within the housing 30.

The shank portion 68 of the collet 32 has (FIG. 3) a smaller outer diameter than the constant inner diameter of the cylindrical portion 56 of the housing, hence the collet shank 68 is radially inwardly spaced from the housing inner surface 48 (FIG. 4) at the rear end portion 56 of the housing.

The collet shank portion 68 extends (FIG. 4) into the aforementioned hollow barrel 36. The barrel 36 is mounted by means of an external thread 84 (FIG. 3) mating with the internal thread 58 on the inside surface of the housing 30 for telescoping relationship with the housing. The inside diameter of the barrel 36 matches the outside diameter of the shank portion 68 of the collet for engaging (FIG. 4) and co-axially positioning the shank portion 68 within the barrel. The front end surface 86 of the barrel wall within the housing 30 has a conic shape corresponding to the shape of the conic surface 66 on the collet interconnecting the middle cylindrical 64 and shank 68 portions of the collet.

As previously noted, the collet 32 has an open and a closed condition. In its open condition, shown in FIGS. 3 and 5, no significant radially inward directed forces are applied against the collet, and the wall segments 78 thereof remain in their circumferentially spaced apart relationship. The passageway 70 through the collet defined by the four wall segments is thus of constant diameter from front to end, and the diameter of the passageway 70 is somewhat greater than the outside diameter of the fiber 20 being processed by the assembly. The open condition diameter of the passageway 70 is discussed further hereinafter.

Figure 7:
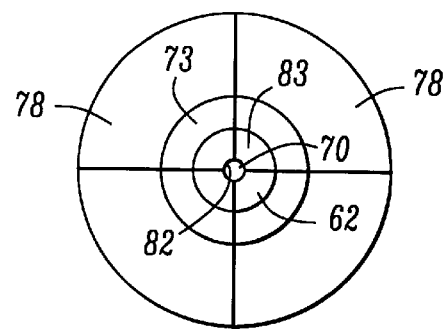
FIG. 7 is a view similar to FIG. 5 but showing the front end of the collet in its "closed" condition.

The closed condition of the collet is shown in FIGS. 4 and 7. As previously explained, the collet wall segments 78 are normally in circumferentially spaced apart relationship. They can be squeezed together, however, by the application of radially inwardly directed forces. This is accomplished by screwing the barrel 36 further forwardly into the outer housing. Two squeezing forces are produced. One results from the conic surface 86 at the front end of the barrel 36 pushing against the conic surface 66 of the collet. Owing to the shape of these surfaces, the axial force from the barrel is partially resolved into radially inwardly directed forces on the collet wall segments tending to squeeze the wall segments together.

The other squeezing force results from the collet being pushed forward by the barrel 36 through the housing conic front portion 52. The housing wall is quite rigid, and the forward advance of the collet is accompanied by a squeezing together of the wall segments.

The effect of such squeezing forces is shown in FIG. 4. Owing to the cantilevered mounting of the collet wall segments 78, the four wall segments pivot radially inwardly from their connected together rear ends 74, and the actual contraction of the collet passageway varies from end to end of the collet, with the greatest contraction occurring at the front end of the collet. Thus, when the front end portions of the wall segments first collapse into mutual, side-by-side engagement, the rear end portions thereof remain spaced apart, and the passageway through the "closed" collet increases from a minimum inside diameter (as firmly established when the front wall segments contact one another) at the front end 73 of the collet to the rear end 74 thereof.

As shown in FIG. 4, the shank portion 68 of the collet 32 extends into the barrel 36 but terminates short of the rear end 44 thereof. An optical fiber is to be threaded through the collet (as hereinafter described) and thence outwardly from the rear end of the barrel. For a reason to be described, it is preferable that an exit opening 90 for the fiber from the barrel 36 have only a very slightly larger diameter than the outer diameter of the fiber (e.g., an opening 90 diameter of 300 microns for an optical fiber of 250 microns outside diameter). Conversely, for purpose of automatically guiding the leading end of a fiber being threaded through the assembly 12 into the barrel exit opening, the passageway 92 leading to the exit opening 90 should be large. This is accomplished by the use of a short cylinder 94 screwed into the rear end 44 of the barrel 36. The cylinder 94 has a rearwardly extending passageway 96 of the desired diameter close to that of the optical fiber 20, and the passageway 96 tapers outwardly forwardly for providing the desired guiding surface 92 for the fiber into the exit passageway 96.

An open space 98 (FIG. 4) is provided between the end 74 of the collet shank 68 and the exit cylinder 94 of the barrel 36. Communication to this space is provided by means of an opening 100 through the barrel wall.

As previously noted, in use of the inventive assembly, the outer plastic layers of an optical fiber disposed within the assembly are soaked in a fluid for softening the plastic layers. A containing space within the assembly for the fluid comprises the aforementioned space 98 within the barrel 36, which space communicates with the passageway 70 through the collet. Entry of the fluid into the collet passageway is enhanced by a slight enlargement 77 of the slot 76 at the rear end 74 of the collet. By pouring a fluid through the opening 100 through the barrel 36, the spaces within the assembly can be filled with the fluid which, with a fiber in place, tends to remain within the assembly for soaking the within fiber.

The use of the assembly is now described. With the assembly in the condition shown in FIGS. 3 and 5, that is, with the wall segments 78 of the collet in open and spaced apart relationship, an end of an optical fiber is threaded into the open front end 73 of the collet 32 at the open front end 42 of the housing 30 and entirely through the assembly. With the collet 32 merely held in place within the assembly 12, but not being forwardly pushed by the barrel 36 (i.e., with the barrel screwed into the housing but not being tightened against the collet conic surface 66), the collet wall segments 78 (jaws 78 hereinafter) remain parallel to the collet central axis 70a, hence in spaced apart, jaws open position.

The passageway 70 through the open collet 32 (similarly to the exit passageway 96 through the barrel 36) is only slightly larger in diameter than the fiber being processed, but the fiber is readily guided into the passageway 70 by means of the conic surface 83 at the front end 73 of the collet. After passing through and outwardly from the end 74 of the collet shank portion 68, the fiber end (relatively stiff, as known) is guided by the barrel cylinder guiding surface 92 (FIG. 4) into and through the relatively small exit passageway 96 of the barrel cylinder 94. Preferably, at least initially, the front end of the fiber extends at least a few inches outwardly from the barrel rear end 44.

With the fiber in place within the assembly, a known fluid, e.g., the aforementioned methylene chloride, is poured, e.g., using an eye dropper, into the assembly through the barrel opening 100. Even with the relating small clearances within the assembly, the fluid spreads fully within the assembly. A simple test for complete filling of the assembly is when the fluid begins to drip from the ends of the assembly. Significantly, however, when the filling of the assembly with the fluid is stopped, the fluid tends to stay in place owing to the tight fit of the fiber through the assembly front and rear fiber openings and the attendant sealing of these openings by the surface tension of the fluid.

After the assembly has been filled with the fluid, the end of the fiber extending outwardly from the assembly rear end 44 is generally, but not necessarily, cut-off flush with the barrel rear surface.

The fluid is allowed to soak the fiber for some time, e.g., 2–5 minutes, long enough for the fiber plastic layers to soften and slightly swell in volume. The swollen and expanded plastic layers fill the passageways through the assembly but not so tightly as to lock the fiber in place. (As described, the collet passageway has an inner diameter, in its "open" condition shown in FIGS. 3 and 5, of around 300 microns. The soaked fiber, originally of an outer diameter of 250 microns, expands to, generally, fill the collet passageway 70, i.e., to an outer diameter of around 300 microns.) For grasping the softened plastic layers, the collet jaws 78 are caused to converge onto and around the fiber. As previously described, this is accomplished by screwing the barrel 36 further inwardly of the outer housing 30, thereby applying radial forces against the conic surface 66 at the rear of the cylinder section 64 of the collet and against the conical surface 62 at the front end 73 of the collet. The collet jaws thus pivot radially inwardly about their rear connected ends and are forced together into side-by-side mutual contact as shown in FIGS. 4 and 7.

The barrel 36 is screwed forwardly until a firm resistance to further advance of the barrel is reached. This occurs when the front ends of the jaws first make mutual contact. At this time, the front end of the collet passageway 70 has collapsed a precise and definite amount (to a minimum possible inner diameter) onto and around the fiber along a front portion of the collet as shown in FIG. 4. To the extent that further forced screwing of the barrel occurs, the only result, owing to the side-by-side contacting of the jaws 78, is that while the diameter of the collet passageway at the front end of the collet remains fixed, the length of the portion of the passageway 70 collapsed to the minimum possible inner diameter is extended rearwardly along the collet. This is of no particular significance because, provided the grasping of the fiber plastic outer layers by the front end portions of the collet jaws is sufficiently tight, further rearward grasping of the plastic layers by the jaws is neither required nor harmful.

What is essential, however, is that owing to the precision of the closed, minimum inner diameter of the passageway 70 through the collet, a precisely controlled maximum compression of the fiber occurs which is uniformly applied around the circumference of the fiber. The amount of fiber compression selected is small enough to avoid any significant compression of the glass core portions of the fiber but large enough to provide a firm grasping of the softened plastic layers. Also, the symmetrically applied forces avoid any bendings or twisting of the glass core. Accordingly, by grasping the fiber as hereindescribed, no damage of the glass core portions of the fiber occurs.

With the collet jaws 78 firmly clamped around the softened plastic outer layers of the fiber, the assembly is moved axially of the fiber for stripping the plastic layers off the free end of the fiber. In FIG. 1, for example, with the fiber 20 clamped in place relative to the assembly, e.g., by being clamped in a clamping mechanism mounted on a track on which the slide block 10 is mounted (as previously described), the slide block 10 is moved along the track to the right as viewed in FIG. 1. The assembly, including the clamped plastic layers, is thus slid off the end of the fiber extending from the rear end 44 of the assembly.

As mentioned, the softening fluid is retained within the assembly and never contacts the glass core portions exposed at the leading end of the fiber. (This is the reason a short length of the fiber is extended from the rear end of the assembly until after the fluid filling process has been completed. Any fluid dripping out the rear end of the assembly during the filling process thus falls from the assembly while not contacting the fiber exposed glass portions.)

Further features of the invention are that the point along the fiber where the plastic coating is removed is sharply defined; the stripped and newly exposed surfaces of the fiber glass core portions are clean and free of contaminants; and the glass core portions are free of any structural damage. All of these features follow from the formation, by the assembly, of a sharp line of demarcation between the soaked and unsoaked portions of the plastic coating, and the precisely controlled maximum and symmetrical forces applied only against the softened portions of the plastic layer. The sharp line of demarcation is the front surface 82 of the collet passageway 90. Rearwardly of this surface (inwardly of the assembly), the plastic coating is soaked and softened. Forwardly of this surface (outwardly from the assembly front end), the plastic coating is not contacted by the fluid. Upon grasping of the softened layer, symmetrical grasping forces are applied beginning precisely at the front surface 82 of the collet passageway 70 and not forwardly thereof against unsoaked portions of the fiber.

Accordingly, a sharply defined radial surface is provided in the fiber plastic coating between the soaked and grasped and compressed portion of the plastic coating and the adjoining non-soaked and non-grasped portion of the plastic coating immediately outside the end 82 of the collet passageway 80.

Owing to the controlled and uniformly applied grasping forces, the softened plastic coating is easily and smoothly pulled off the underlying glass core portions which remain completely unstressed and undamaged by the process. The clean and undamaged plastic stripped end of the fiber is now available for being spliced, in known manner, to another optical fiber. Experiments have shown that the quality of the resulting splices made using fibers stripped according to this invention is exceptionally high.

What is claimed is:

1. A method of stripping a plastic layer coating from a circular optical fiber comprising the steps of disposing a fiber along an axis within a chamber containing a plastic softening fluid for softening a length of the plastic coating on the fiber, converging circular jaws radially inwardly towards said axis and onto the softened plastic layer for circumferentially grasping the layer, and translating said converged jaws axially of the fiber for stripping the softened layer from the fiber.

2. A method of according to claim 1 wherein said chamber includes an elongated, hollow cylinder including a circular wall formed from circumferentially spaced apart and axially extending wall segments, and said converging step comprises applying radially inwardly directed forces against said wall segments.

3. A method according to claim 2 wherein said hollow cylinder has an elongated passageway therethrough having a first internal diameter, and including the step of threading the front end of an optical fiber into a front, enlarged diameter end of said passageway, through said cylinder and outwardly of a rear end thereof and thence through an enlarged front end of an exit passageway of said chamber.

4. An assembly for stripping a plastic coating from a circular optical fiber having a preselected outer diameter, the assembly comprising a chamber for containing a plastic softening fluid for softening a plastic coating on a fiber disposed along an axis through said chamber, convergible, circular jaws disposed surrounding said axis and defining an axially extending, circular passageway for an optical fiber therein, and means for converging said jaws radially inwardly towards said axis for reducing the diameter of said passageway for circumferentially compressing and grasping an axially extending length of the plastic coating of a fiber disposed along said axis.

5. An assembly according to claim 4 wherein said, passageway has, in its jaws non-converged condition, a diameter sufficiently large for allowing swelling of the plastic coating of a fiber contained within said passageway and soaked within a fluid contained within said chamber.

6. An assembly for stripping a plastic layer from an end of an optical fiber comprising a collet including convergible jaws for receipt of a fiber extending axially through the collet, an enclosure for the collet for containing a fluid for softening the plastic coating of the fiber, and means for causing convergence of the collet jaws for grasping the plastic coating of a fiber softened by a softening fluid within the housing, whereby, upon causing relative axial movement between said assembly and a fiber within said collet and towards a front end of the fiber, a softened plastic coating on the fiber is stripped therefrom.

7. An assembly according to claim 6 wherein said collet comprises a hollow, circular cylinder having a minimum inside diameter when said collet jaws have been converged, and a larger inside diameter when said jaws are in a preconverged condition, said larger inside diameter being comparable to the diameter attained by a fiber within said collet upon the soaking of the fiber in said fluid for a pre-set period of time.

8. An assembly according to claim 7 wherein said collet cylinder comprises a wall formed by a plurality of axially extending, circumferentially disposed wall segments, all of said segments having first, free ends at one end of said collet and second ends all of which are connected together at a second end of said collet, said free ends of said wall segments being in side-by-side contacting relationship when said jaws have been converged, and said wall segments being circumferentially spaced apart from one another when in said pre-converged condition.

9. An assembly according to claim 8 wherein said collet wall segments, at said one end, are shaped to form a cone of increasing diameter rearwardly from said one end, said housing comprises a hollow, circular cylinder, and said collet is disposed axially within said housing with said one end of said collet being disposed at a first open end of said housing.

10. An assembly according to claim 9, wherein an inner surface of said housing adjoining said front end thereof has a conical shape conforming to the shape of said collet cone for providing a surface-to-surface contacting of said collet cone with said housing conical surface.

11. An assembly according to claim 10, wherein said collet cone merges into a collet cylindrical portion adjoining a conic surface of decreasing outside diameter adjoining a collet shank portion having an outside diameter less than said collet cylindrical portion, said shank portion terminating at said second end of said collet, said housing having a cylindrical inside surface in surface-to-surface contact with said collet cylindrical portion and encircling said shank portion in radial spaced apart relation therewith.

12. An assembly according to claim 11 including a hollow, circular cylindrical barrel extending into said housing from a second end thereof and being axially movable relative to said housing, said barrel including a conic surface for engagement with the conic surface on said collet adjoining the collet shank portion, whereby, upon axial movement of said barrel inwardly of said housing for engaging said barrel and collet conic surfaces, axial movement of said barrel is translated into inwardly jaw converging movements of said collet wall segments.

13. An assembly according to claim 12 wherein said barrel has an axially extending exit passageway having a front end disposed within said housing and axially spaced from said second end of said collet, and said barrel housing has an opening through the cylindrical wall thereof for admitting a fluid into said barrel and into said collet.

14. An assembly according to claim 13 wherein said exit passageway has an inner diameter sufficiently large to allow threading of an optical fiber therethrough but with such small clearance as to allow sealing of said passageway against leakage of a fluid admitted into said barrel owing to surface tension of the fluid within said fiber containing passageway.

15. An assembly according to claim 14 wherein said exit passageway has an opening of increasing diameter towards said collet second end for providing automatic guiding of the end of a fiber being threaded through said collet through said exit passageway.

16. A method according to claim 1 wherein each of said jaws has axially spaced apart front and rear ends, and said converging step comprises pivoting said jaws around said rear ends for causing said grasping of the fiber layer by said front ends while leaving a gap between said layer and portions of each of said jaws adjacent to the second ends thereof.

17. A method according to claim 16 wherein said jaws define, prior to said converging step, a circular passageway having first and second axially extending portions joined at a circumferential edge, said first portion being of a preselected constant inner diameter between said front and rear ends, and said second portion being of increasing inner diameter in a direction away from said edge, and wherein said disposing step comprises threading a fiber having a preselected outer diameter through said second portion of said passageway and into said first passageway portion, the size relationship between said passageway preselected inner dimension and said fiber outer diameter preventing escape of fluid within said passageway first portion into said passageway second portion owing to surface tension adhesion of said fluid.

18. A method according to claim 17 wherein said converging step comprises grasping the swollen coating along a length thereof beginning at said circumferential edge for stripping only fluid softened portions of said coating for defining a sharp break between the stripped and non-stripped portions of the fiber coating.

19. A method according to claim 1 wherein said optical fiber has a central core of a first preselected diameter and said fiber has a second preselected outer diameter; and said converging step comprises grasping the fiber softened layer sufficiently tightly for compacting the softened layer while avoiding compressing said core.

20. An assembly according to claim 4 wherein each of said jaws has axially spaced apart front and rear ends, and said converging means includes means for pivoting said jaws around said rear ends for causing said jaw front ends to converge more closely towards said axis than portions of said jaws adjacent to said rear ends thereof.

21. An assembly according to claim 6 for stripping a fiber of a preselected outer diameter, said collet jaws defining a passageway for receipt of said fiber, said passageway having a first preselected inner diameter reduced to a second inner diameter upon said convergence of jaws, and the size relationship between said fiber outer diameter and said passageway first inner diameter being effective for preventing escape of fluid within said passageway owing to surface tension adhesion of said fluid.

22. An assembly according to claim 8 wherein said connected together wall segment second ends define a rigid, circular cylinder having a fixed inner diameter, and when said jaws have been converged, said collet minimum inside diameter is at said free ends of said wall segments with said collet inside diameter increasing with distance from said free ends towards said second ends.

* * * * *